Dec. 31, 1968   A. H. LOOS   3,418,745
FISHING LURE COVER
Filed Oct. 20, 1965
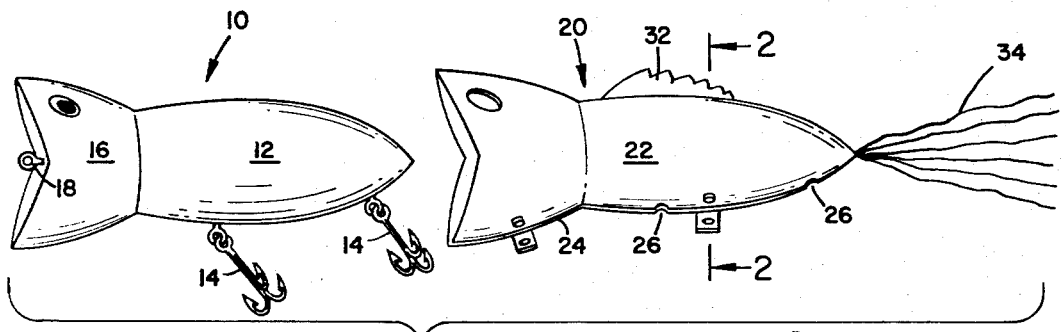
FIG_1
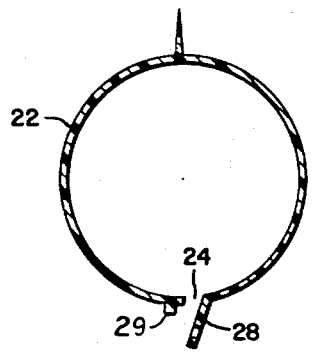
FIG_2
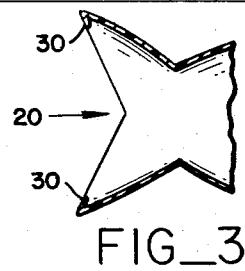
FIG_3
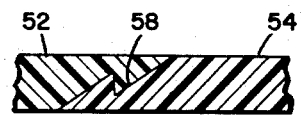
FIG_5
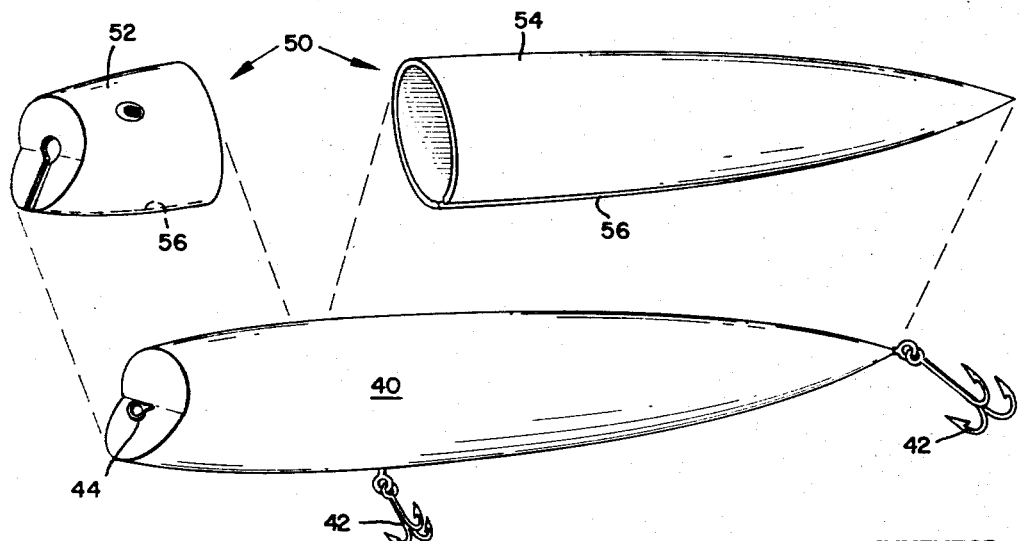
FIG_4
INVENTOR.
ALVIN H. LOOS
BY
Paul B. Fike
PATENT AGENT 3,418,745
FISHING LURE COVER
Alvin H. Loos, 515 Nordyke Drive, Apt. D,
San Jose, Calif. 95127
Filed Oct. 20, 1965, Ser. No. 498,722
2 Claims. (Cl. 43—42.09)

ABSTRACT OF THE DISCLOSURE

A cover for a fishing lure which comprises a hollow one piece body member whose interior dimensions correspond generally to the exterior dimensions of the lure. The cover is longitudinally slotted to allow it to be mounted in telescopic relationship over the lure and subsequently secured thereon by a releasable securing mechanism. The securing mechanism includes interengaging latch elements on respective sides of the slot, which are formed as components of the cover.

---

The present invention relates generally to artificial fishing baits and lures and more particularly to removable covers for such lures.

As is well established, different species of fish are attracted by lures of different shapes and colors and, as a consequence, fishermen typically carry a large variety of artificial fishing baits or lures in their bait boxes, many of these differing only in color or slightly in shape. While the fishermen consider such variety essential to optimize the results of their efforts, the number of lures quickly becomes excessive.

Accordingly, it is a general object of the present invention to provide one or more lure covers adapted for releasable mounting on a lure to change the exterior appearance thereof.

More particularly, it is a feature of the invention to provide a plurality of lure covers each of which constitutes a hollow, open-ended structure so that the lure covers can be stored in a compact, nested relationship.

Additionally, it is a feature of the invention to provide lure covers which are adapted for attachment to standard commercial lures so that no modification of the latter is required.

More particularly, it is a feature of the invention to provide a lure cover which can be fabricated in one or more sections to enable ready accommodation to standard lures of variant shapes.

A related feature of the invention is the provision of a lure cover which can be easily attached to a lure yet, when so attached, is secure in its mounting.

These as well as other objects and features of the invention will become more apparent from a perusal of the following description of the exemplary embodiments of the invention illustrated in the accompanying drawing wherein:

FIG. 1 is a perspective view of a lure cover embodying the present invention ready for attachment to an associated lure, FIG. 2 is a transverse sectional view taken along line 2—2 of FIG. 1, FIG. 3 is an enlarged fragmentary sectional view of the forward portion of the lure cover of FIG. 1 illustrating one form of attachment mechanism, FIG. 4 is a perspective view of a two-section lure cover constituting a modified embodiment of the invention shown in association with another standard lure, and FIG. 5 is a fragmentary sectional view showing the preferred method of attachment of the two sections of the lure cover of FIG. 4 when mounted on the lure.

With initial reference to FIG. 1, a lure cover, generally indicated at 20, constitutes one embodiment of the invention specifically designed for mounting over the exterior of a standard lure 10 which consists of a rearwardly convergent body member 12 having two hooks 14 attached to its under side and a forwardly divergent head portion 16 providing an open mouthed appearance centrally of which an attaching eyelet 18 is secured. The illustrated lure 10 constitutes a standard commercial item whose peculiar characteristic is that the entire structure converges slightly throughout its entire length from the forward extremity to its tail portion.

Such configuration of the lure 10 shown in FIG. 1 enables the mentioned lure cover 20 to take the form of a single, hollow body member 22 which in turn tapers inwardly or in a convergent fashion from its open forward end, to the left as viewed in FIG. 1, to its rearmost extremity. More particularly, the lure cover 20 has the same general configuration as the lure 10 itself with its hollow interior dimensions conforming quite closely to the exterior dimensions of the lure. The hollow body member 22 of the lure cover is preferably formed from a relatively thin layer of resilient plastic material that is formed with a longitudinal slot 24 on its under surface throughout its entire length. Accordingly, the lure cover 20 can readily be shoved over the body of the lure 10 from the tail end thereof until the lure is substantially entirely covered, the aforementioned slot 24 expanding during such action to permit passage of the structure over the attached hooks 14 on the lure 10.

Preferably, the aforementioned slot 24 is slightly widened to form openings 26 at positions of registration with the hooks 14 so that upon completion of assembly of the lure cover 20 over the lure 10 itself, the inherent resiliency of the plastic material will enable the slot 24 to close and the hooks 14 will then be accommodated within the enlarged openings 26. The inherent resiliency of the plastic material constitutes one simple means for releasably attaching the lure cover 20 to the lure 10 itself.

Dependent upon the precise configuration of the lure, such resilient attachment may be sufficient. In other cases, it is preferred to have one or more additional means for such releasable attachment. With reference to FIG. 2, the lure cover 20 can include a conventional snap-type fastener 28, 29 arranged for pressed connection over a projection 29 in bridging relationship across the described longitudinal slot 24 in the lure cover, thus to positively retain the resilient plastic material in gripping engagement with the body of the lure 10. Preferably, two such snap fasteners 28, 29 are integrally incorporated on the plastic material at the head portion and intermediate the body portion thereof.

An additional fastening means can be incorporated at the forward open end of the lure cover 20. As shown in FIG. 3, such resilient attaching means takes the form of a simple inturned flange or lip 30 at the forward extremity of the lure cover which is adapted to overlie the open mouth portion of the lure 10 to resiliently resist rearward withdrawal of the lure cover 20 from its mounted position. In particular, if this lip 30 is conjoined with the snap fasteners 28, 29 on the under surface of the lure cover, a firm attachment of the lure cover 20 to the lure 10 is assured.

In accordance with an additional aspect of the invention, the lure cover 20 can be colored in any desired fashion and a plurality of lure covers having different coloring can be purchased as a group, each of which can be attached to the lure 10 dependent upon the particular species of fish being sought by the fisherman. Because of the open-ended, tapered configuration of the lure cover 20, all of the covers can be shoved together in a nested telescopic relationship so as to occupy but a small space in the fisherman's bait box.

If desired, various lure covers 20 having the same general configuration to accommodate themselves to the lure shown in FIG. 1, can have changes in appearance other than the mentioned color variations. As shown in FIG. 1, the lure cover 20 can have an integral fin 32 mounted along its upper surface or, alternatively, can include a tail member 34 at its rearmost extremity. Such slight variations in exterior shape or configuration of the lure cover 20 do not preclude its ready mounting on the lure 10 since the interior of the lure cover 20 remains the same thus to accommodate itself readily to the lure.

It will be apparent that the structure shown in FIGS. 1, 2 and 3 and described hereinabove is readily adapted for mounting on the lure 10 which is a standard structure and moreover, such lure need be modified in no way to enable reception of the described cover. It will also be apparent that this principle of providing a lure cover that accommodates itself to a standard lure without modification of the latter, can be extended to many other lures having variant shapes and sizes. If, for example, the lure is of the standard type indicated at 40 in FIG. 4, having a body member which is of maximum diameter at a central position and tapers inwardly in a convergent fashion both toward the head and tail ends thereof, it is preferred to form the lure cover 50 in two sections 52, 54, also as illustrated in FIG. 4, so that the head section 52 of the lure cover, having interior dimensions conforming closely to the exterior dimensions of the lure 40 at its forward or head portion, can be slipped over the forward end of the body and, in a similar fashion, the second or rearward section 54 of the lure cover can be applied over the rearmost or tail portion of the lure body. Both sections of the lure cover 50 are longitudinally slotted as shown at 56 in the fashion described in connection with the first embodiment of the invention to facilitate the slideable mounting of both sections over the lure body so as to accommodate hooks 42 on the body of the lure and an eyelet 44 adjacent its head portion enabling connection of the lure to the fishing line.

The sections 52, 54 of the lure cover shown in FIG. 4 are formed for resilient connection at their positions of juncture centrally of the lure 40, preferably by a simple hooked joint 58 most clearly shown in FIG. 5. The extremities or lips of the two sections 52, 54 are provided with opposite tapered configurations which are centrally stepped to provide the hook joint 58. As the sections 52, 54 are pushed together, the lip portions are cammed apart until the hooks come into registration whereupon the inherent resiliency of the plastic material effects the interlocking of hooks as specifically shown in FIG. 5 to form the joint 58. Thus, a particularly simple attaching means for the lure cover 50 on the lure 40 is provided.

What is claimed is:
1. A cover for a fishing lure which comprises
a one-piece hollow body member of resilient material having interior dimensions substantially equal to the exterior dimensions of the lure,
means forming a longitudinal slot in said body member, and
means for releasably joining portions of said body member on opposite sides of said slot,
said last mentioned means comprising components of said one piece hollow body member and said components comprising a projection at one side of said slot and a snap type fastener at the other side of said slot and cooperating with said projection.

2. A cover for a fishing lure which comprises
a one-piece hollow body member of resilient material having interior dimensions substantially equal to the exterior dimensions of the lure,
said hollow body member including a slot extending substantially the entire length thereof,
means for directly interconnecting portions of said body member on opposite sides of said slot to provide releasable attachment of said body member to the lure,
said interconnecting means comprising interengaging latch elements on respective sides of said slot, and
said latch elements being components of said one-piece hollow body member.

References Cited

UNITED STATES PATENTS

| | | | |
|---|---|---|---|
| 586,620 | 7/1897 | Osborn | 43—42.09 |
| 1,599,763 | 9/1926 | Head | 43—42.09 |
| 1,600,652 | 9/1926 | Steenstrup | 43—42.09 |
| 2,578,411 | 12/1951 | Fisher | 43—42.09 |
| 2,951,308 | 9/1960 | Kent | 43—42.09 X |

SAMUEL KOREN, *Primary Examiner.*

J. H. CZERWONKY, *Assistant Examiner.*